(12) United States Patent
Deluca et al.

(10) Patent No.: US 9,021,376 B2
(45) Date of Patent: Apr. 28, 2015

(54) TASK TIMER

(75) Inventors: Lisa Seacat Deluca, San Francisco, CA (US); Xue Jiang, Billerica, MA (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/539,681

(22) Filed: Jul. 2, 2012

(65) Prior Publication Data
US 2014/0006993 A1 Jan. 2, 2014

(51) Int. Cl.
*G06F 3/048* (2013.01)
*G06F 3/0481* (2013.01)
*G06F 9/44* (2006.01)
*G06F 1/32* (2006.01)
G06F 9/50 (2006.01)
H04N 21/422 (2011.01)
G06F 11/36 (2006.01)
G06F 21/36 (2013.01)
G06F 11/32 (2006.01)
G06F 9/48 (2006.01)
G06Q 10/10 (2012.01)
G06F 15/02 (2006.01)

(52) U.S. Cl.
CPC .......... *G06F 3/04817* (2013.01); *G06F 9/5038* (2013.01); *G06F 9/4443* (2013.01); *H04N 21/42224* (2013.01); *G06F 11/3664* (2013.01); *G06F 1/3228* (2013.01); *G06F 21/36* (2013.01); *G06F 11/327* (2013.01); *G06F 9/4825* (2013.01); *G06Q 10/1097* (2013.01); *G06Q 10/109* (2013.01); *G06Q 10/10* (2013.01); *G06F 15/0266* (2013.01); *Y10S 715/963* (2013.01)

(58) Field of Classification Search
CPC ... G06F 1/3228; G06F 9/4443; G06F 9/4825; G06F 9/5038; G06F 11/3664; G06F 3/04817; G06F 21/36; G06F 11/327; G06F 15/0266; H04N 21/42224; G06Q 10/10; G06Q 10/109; G06Q 10/1097
USPC .................................. 715/772, 793
See application file for complete search history.

(56) References Cited

U.S. PATENT DOCUMENTS

| | | | |
|---|---|---|---|
| 4,937,743 A * | 6/1990 | Rassman et al. | 705/7.22 |
| 5,442,746 A * | 8/1995 | Barrett | 715/854 |
| 5,999,492 A * | 12/1999 | Teixeira | 368/10 |
| 6,034,683 A * | 3/2000 | Mansour et al. | 715/764 |
| 6,047,260 A * | 4/2000 | Levinson | 705/7.15 |
| 6,092,048 A * | 7/2000 | Nakaoka | 705/7.15 |
| 6,898,569 B1 | 5/2005 | Bansal et al. | |
| 6,937,950 B2 * | 8/2005 | Cragun et al. | 702/71 |
| 7,250,955 B1 * | 7/2007 | Beeman et al. | 345/592 |
| 7,274,375 B1 * | 9/2007 | David | 345/619 |
| 7,821,874 B2 | 10/2010 | Liu et al. | |
| 7,836,400 B2 | 11/2010 | May et al. | |
| 7,949,610 B2 * | 5/2011 | Belvin et al. | 705/301 |

(Continued)

*Primary Examiner* — Patrick Riegler
*Assistant Examiner* — Jennifer Nichols
(74) *Attorney, Agent, or Firm* — Law Office of Jim Boice

(57) ABSTRACT

A computer-implemented method, system, and/or computer program product aid a user with time management before a future event. An event alert is received and displayed on a user interface at a computer. In response to receiving the event alert, an irremovable countdown icon is automatically generated and displayed on the user interface. The irremovable countdown icon, which represents an amount of time remaining before the future event, cannot be removed from the user interface until after the future event has started.

5 Claims, 5 Drawing Sheets

(56) References Cited

U.S. PATENT DOCUMENTS

| | | | |
|---|---|---|---|
| 8,687,467 B2* | 4/2014 | Comeau | 368/82 |
| 2002/0085034 A1* | 7/2002 | Cortright | 345/764 |
| 2003/0206197 A1* | 11/2003 | McInerney | 345/764 |
| 2004/0061716 A1* | 4/2004 | Cheung et al. | 345/710 |
| 2004/0225966 A1* | 11/2004 | Besharat et al. | 715/705 |
| 2004/0266491 A1* | 12/2004 | Howard et al. | 455/567 |
| 2005/0234812 A1* | 10/2005 | Dorr | 705/37 |
| 2005/0256754 A1* | 11/2005 | Nastacio | 705/8 |
| 2006/0007785 A1* | 1/2006 | Fernandez et al. | 368/10 |
| 2007/0086275 A1* | 4/2007 | Robinson et al. | 368/72 |
| 2007/0124681 A1* | 5/2007 | Abbar et al. | 715/730 |
| 2007/0245300 A1* | 10/2007 | Chan et al. | 717/105 |
| 2007/0255593 A1* | 11/2007 | Muehlmeier et al. | 705/2 |
| 2008/0040187 A1 | 2/2008 | Carraher et al. | |
| 2008/0212410 A1* | 9/2008 | May et al. | 368/29 |
| 2008/0222529 A1 | 9/2008 | Castelli et al. | |
| 2009/0040878 A1* | 2/2009 | Domes et al. | 368/107 |
| 2009/0140855 A1 | 6/2009 | Shemesh et al. | |
| 2009/0235253 A1* | 9/2009 | Hope | 718/100 |
| 2009/0239625 A1* | 9/2009 | Yoshizawa | 463/20 |
| 2010/0157742 A1* | 6/2010 | Relyea et al. | 368/28 |
| 2011/0171937 A1 | 7/2011 | Hill et al. | |
| 2011/0246916 A1 | 10/2011 | Leskela et al. | |
| 2011/0273281 A1 | 11/2011 | Adams | |
| 2012/0066629 A1* | 3/2012 | Lee et al. | 715/769 |
| 2012/0084168 A1* | 4/2012 | Adair et al. | 705/26.3 |
| 2013/0081032 A1* | 3/2013 | Levien et al. | 718/102 |

* cited by examiner

TASK TIMER

BACKGROUND

The present disclosure relates to the field of computers, and specifically to the use of computers when used with scheduled events. Still more particularly, the present disclosure relates to time management before scheduled events.

Current email and/or calendar systems may include event alerts, which remind a client user of an upcoming event, such as a meeting, teleconference, etc. Such systems often offer the option of closing the alert (e.g., by clicking a "Done" button found in the presented alert). This option causes the alert to no longer be displayed on the client's user interface, thus putting the client user at risk of forgetting about the upcoming event. Furthermore, such alerts are often irretrievable and/or cannot be reproduced. Thus, the client user is forced to make a mental note of the upcoming event, which negates the benefit of the event alert.

SUMMARY

A computer-implemented method, system, and/or computer program product aid a user with time management before a future event. An event alert is received and displayed on a user interface at a computer. In response to receiving the event alert, an irremovable countdown icon is automatically generated and displayed on the user interface. The irremovable countdown icon, which represents an amount of time remaining before the future event, cannot be removed from the user interface until after the future event has started.

DETAILED DESCRIPTION

Figure 1:
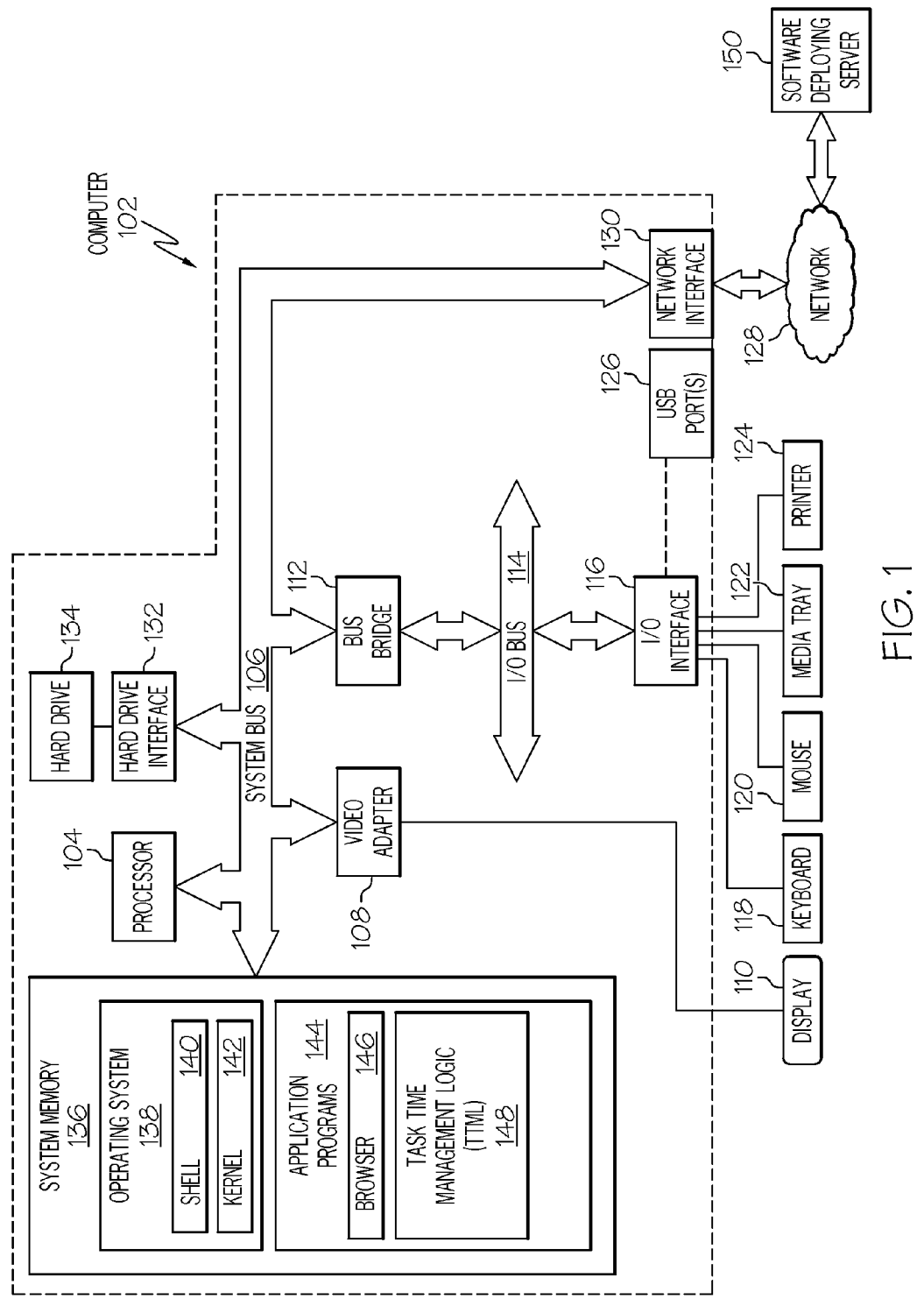
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As noted herein, a complex stream computer utilizes software and hardware components that interact with one another, such that a downstream component is reliant on an output from an upstream component in the complex stream computer. Thus, such systems are notoriously difficult to debug. That is, if the output of the entire stream computer fails, (i.e., if the output is an error code, is nonsense, is outside of an acceptable range, etc.), the upstream cause within the complex stream computer is difficult to identify by simply backtracking. The present invention presents a novel approach to identifying root causes in such cascade processes.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a task time management logic (TTML) 148. TTML 148 includes code for implementing the processes described below, including those described in FIGS. 2-5. In one embodiment, computer 102 is able to download TTML 148 from software deploying server 150, including in an on-demand basis, wherein the code in TTML 148 is not downloaded until needed for execution. Note further that, in one embodiment of the present invention, software deploying server 150 performs all of the functions associated with the present invention (including execution of TTML 148), thus freeing computer 102 from having to use its own internal computing resources to execute TTML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
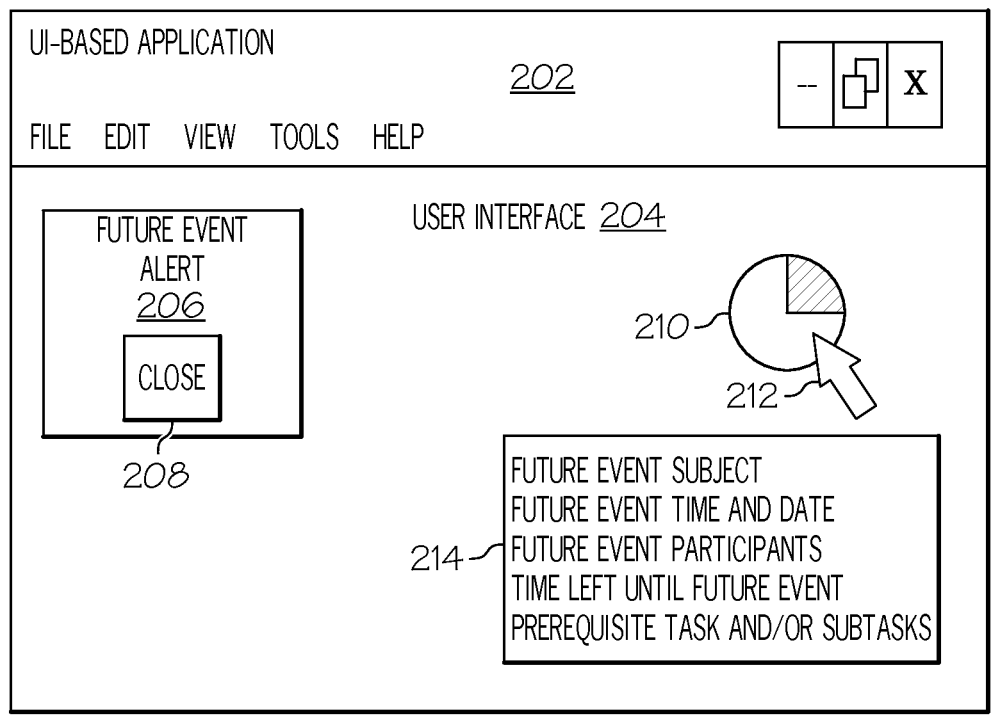
FIG. 2 illustrates an exemplary user interface on which a countdown icon is displayed in response to a future event alert.

With reference now to FIG. 2, an exemplary user interface on which a countdown icon is displayed in response to a future event alert is presented. A user interface (UI) based application 202, such as an instant messaging service, e-mail, etc., includes a user interface 204, on which the application (e.g., e-mails, instant messages, etc.) are displayed. In response to a future event being imminent (e.g., the future event is scheduled to begin in 45 minutes), a future event alert 206 is sent to the client computer which is presenting the UI based application 202. In one embodiment, the future event is a meeting, a teleconference, or any other scheduled event to which a user of the client computer has been invited to attend.

Note that the future event alert 206 includes a close button 208. If the receiving user clicks the close (i.e., "done") button 208, the future event alert 206 will disappear from the user interface 204, often in an irreversible manner. Thus, the recipient of the future event alert 206 must make a mental note of when the future event will begin. However, the present invention addresses this issue by automatically generating and displaying an irremovable countdown icon 210 on the user interface 204. This irremovable countdown icon 210 visually represents an amount of time remaining before the future event (e.g., 45 minutes). Note that, in one embodiment, the irremovable countdown icon 210 cannot be removed from the user interface until after the future event has started. Thus, even if the close button 208 is clicked and the future event alert 206 is removed from the user interface 204, the irremovable countdown icon 210 remains displayed on the user interface 204.

In one embodiment, details of the future event can be retrieved by hovering a cursor 212 over the irremovable countdown icon 210, thus causing a pop-up window 214 to appear. The pop-up window 214 presents information describing and related to the future event, such as the subject, time and date, and participants to the future event, as well as the exact amount of time (i.e., in real time) remaining before the future event begins. In addition, pop-up window 214 can present information related to any prerequisite tasks and/or subtasks related to the future event. That is, as described in further detail below, a future event may have a prerequisite task that must be completed by one or more participants of the future event before the future event begins. For example, assume that the future event is a meeting, and a participant will be presenting a report at the meeting. The prerequisite task would therefore be producing this report before the meeting begins, such that the participant can present the completed report at the meeting.

Figure 3:
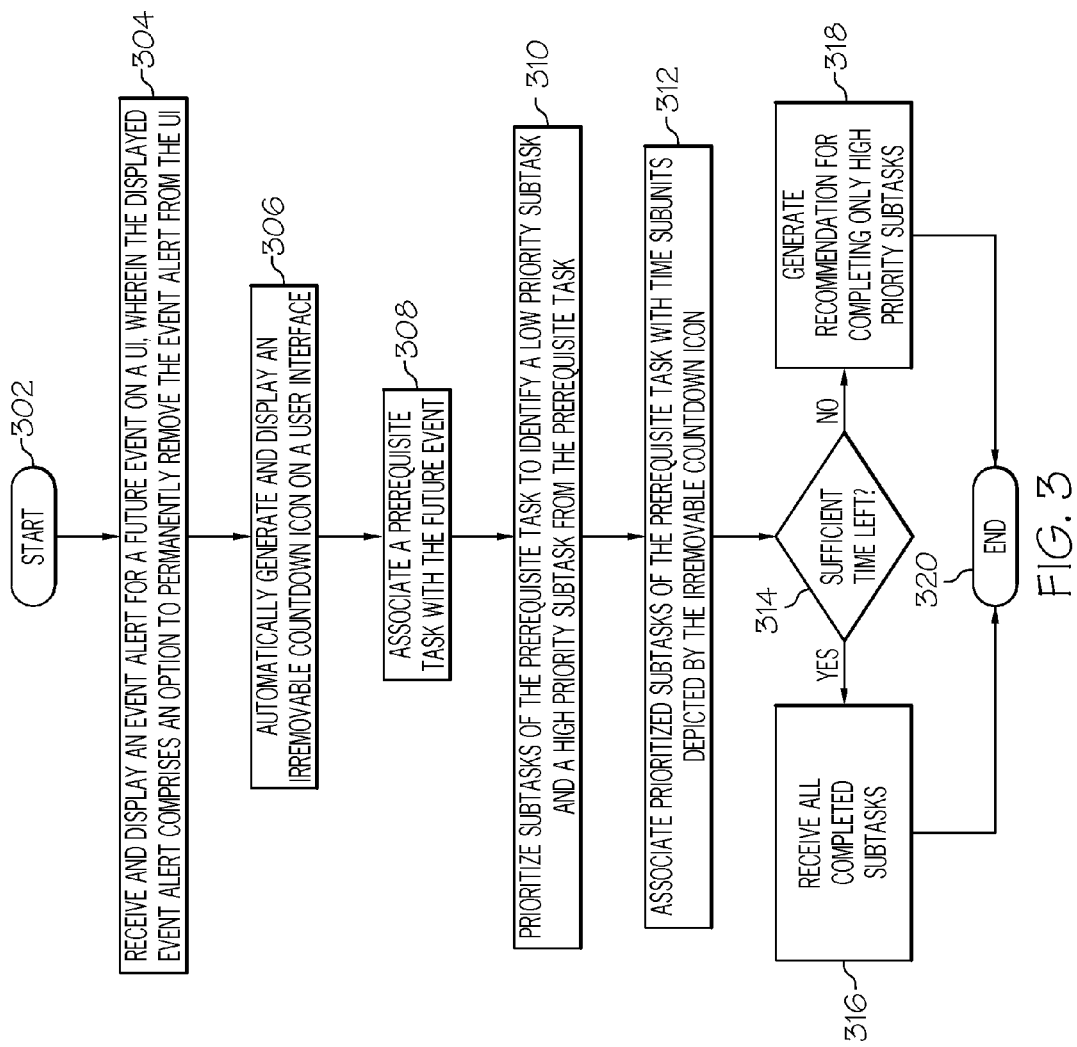
FIG. 3 is a high level flow chart of one or more exemplary steps taken by a processor or other computer hardware to manage a user's time before a future event.

With reference now to FIG. 3, a high level flow chart of one or more exemplary steps taken by a processor or other computer hardware to manage a user's time before a future event is presented. After initiator block 302, an event alert, for a future event, is received at a computer, and is displayed on a user interface on a display of the computer (block 304). Note that in one embodiment, the event alert includes an option to permanently remove the event alert from the user interface (e.g., by clicking the close button 208 shown in FIG. 2).

As described in block 306, in response to receiving the event alert, the computer automatically generates and displays an irremovable countdown icon on the user interface. This irremovable countdown icon (e.g., irremovable countdown icon 210 shown in FIG. 2) visually represents an amount of time remaining before the future event, such as a meeting, teleconference, etc. Note further that, in one embodiment, the irremovable countdown icon is defined as an icon that cannot be removed from the user interface until after the future event has started, even if the close button 208 in FIG. 2 has been clicked.

As described in block 308, in one embodiment of the present invention a prerequisite task is associated with the future event. This prerequisite task has been predetermined to be required to be completed by a participant (e.g., a user of the user interface on which the event alert is displayed) of the future event. In one embodiment, this prerequisite task (e.g., creating a report in preparation for an upcoming meeting) is made up of subtasks. For example, consider FIG. 4, in which a future event 402 is associated with (e.g., mapped to) a prerequisite task 404. Assume also, for exemplary purposes, that the prerequisite task 404 is a report creation task that is made up of multiple subtasks 406a-n (wherein "n" is an integer). In the example shown in FIG. 4, these subtasks include creating a description of the problem to be addressed in the upcoming meeting (406a), creating charts and/or other visual aids to be used with the report (406b), as well as generating recommendations (406n) to address the problem.

Returning to FIG. 3, these subtasks of the prerequisite task can be prioritized in order to identify a low priority subtask and a high priority subtask from the prerequisite task (block 310). That is, the low priority subtask has been predetermined to be less critical to the future event than the high priority subtask. For example, assume that a computer program has determined, based on historical data mining, that a report must have a discussion of a problem (406a in FIG. 4), as well as a recommendation (406n in FIG. 4) for how to fix that problem, in order to be worthwhile. Thus, the problem description and associated recommendation to solve that problem are deemed to be high priority subtasks. Assume further that such data mining has indicated that visual aids (e.g., charts), while somewhat helpful, are not critical to the meeting. Thus, the subtask of creating charts (406b in FIG. 4) is deemed to be a low priority subtask.

Figure 4:
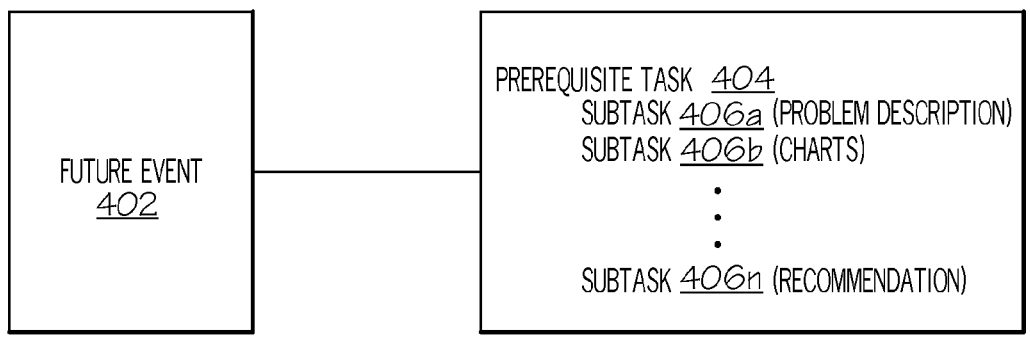
FIG. 4 depicts a relationship between a future event and a prerequisite task for that future event.

As described in block 312, in one embodiment, the subtasks 406a-n depicted in FIG. 4, are associated, with or without prioritization values, with time subunits depicted by the irremovable countdown icon. For example, subtask 406a may be associated with a first fifteen minutes of the time depicted in irremovable countdown icon 210 in FIG. 2; while subtask 406b is associated with the next fifteen minutes of the time depicted in irremovable countdown icon 210; and subtask 406n is associated with the last fifteen minutes of the time depicted in irremovable countdown icon 210.

As described in query block 314 of FIG. 3, if there is sufficient time left to complete all of the subtasks of the prerequisite task, then the computer waits for the completed task (block 316) and the process ends (terminator block 316). In one embodiment, the determination as to whether there is sufficient time remaining before the event/meeting is determined by data mining by the computer, in order to determine historically how long this particular user has needed to complete similar tasks/subtasks. That is, assume that this user routinely generates reports of a similar nature, and that these reports typically take 40 minutes to produce in full. In this example, there are no time issues, since the user will have sufficient time to complete the report. However, in another example, assume that this user has historically taken over an hour to create a similar full report. In this case, a recommendation is generated to modify the prerequisite task by eliminating the low priority subtask from the prerequisite task (block 318).

Figure 5:
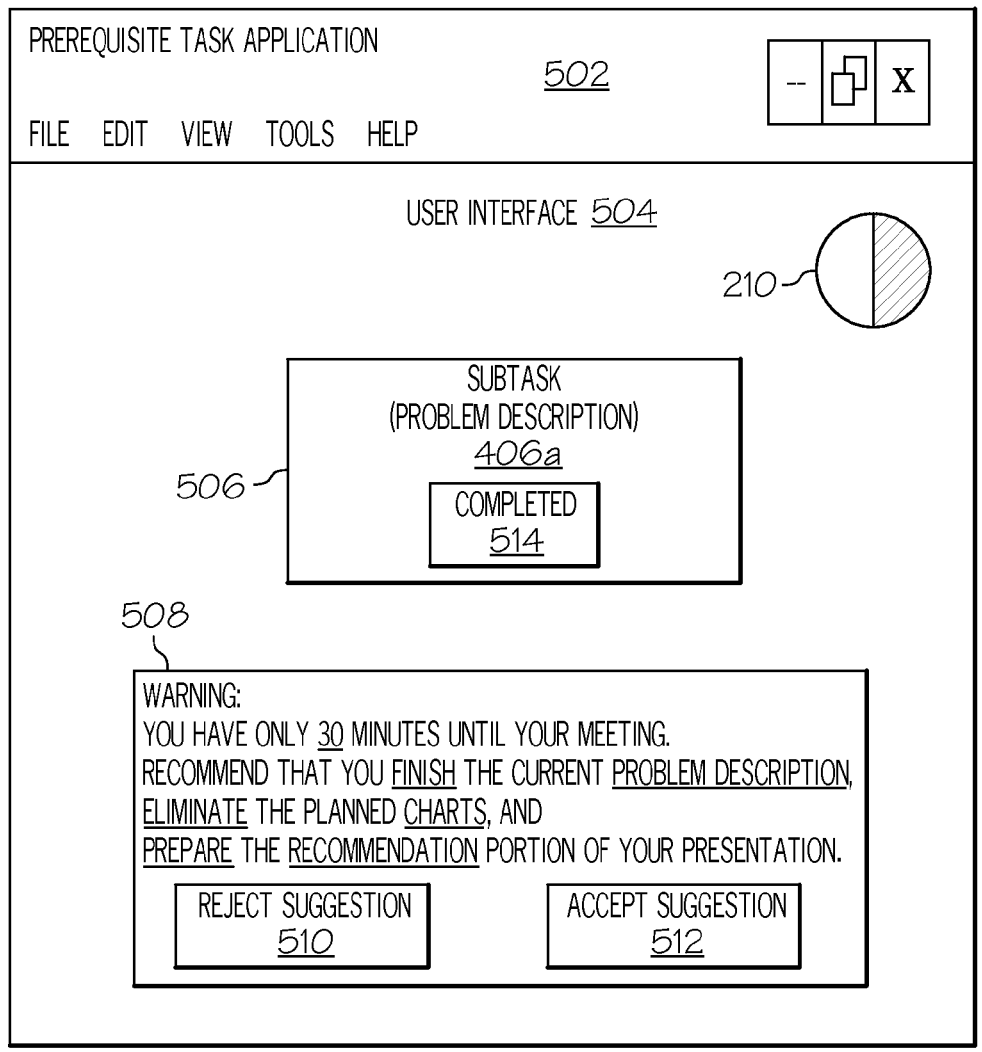
FIG. 5 is an exemplary user interface showing a recommendation for modifying the prerequisite task depicted in FIG. 4.

For example, consider FIG. 5, in which the prerequisite task application 502 (e.g., a report generating program) is in use by a particular user. On the UI 504 is a pane 506, in which the user is working to create a problem description (i.e., subtask 406a shown in FIG. 4). As indicated in the irremovable countdown icon 210, only 30 minutes remain until the event/meeting is to begin. Logic (e.g., TTML 148 shown in FIG. 1) has determined that this user will not be able to complete the full report before the meeting. Therefore, a recommendation is presented in pane 508 for the user to complete the problem description subtask, but to forego the subtask of creating charts, thereby using the remaining time on the more important subtask of preparing a recommendation for solving the problem presented in the problem description. If the user rejects this recommendation (by clicking button 510), then no further suggestions are presented by the computer to the user.

However, if the user accepts (by clicking button 512) the suggestion shown in pane 508, then the computer waits until the problem description subtask is completed (e.g., by the user clicking the "Completed" button 514). Once the "Completed" button 514 is clicked, pane 506 is auto-populated with information needed to work on the recommendation subtask by replacing the information related to the problem description subtask with information related to the recommendation subtask. For example, pane 506 may be populated with template outlines used to generate such recommendations, which then can be completed according to the nature of the problem being addressed at the event/meeting. Similarly, pane 506 can be populated with data that was input/generated during the problem description subtask. For example, if the problem description subtask has identified "cost overruns" as part of the problem to be addressed, the page 506 can be auto-populated with previous generic solutions to such cost overruns.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer-implemented method of aiding a user with time management before a future event, the computer-implemented method comprising:

receiving an event alert, for a future event, at a computer, wherein the computer comprises a display having a user interface;

displaying the event alert on the user interface;

in response to receiving the event alert, automatically generating and displaying an irremovable countdown icon on the user interface, wherein the irremovable countdown icon visually represents an amount of time remaining before the future event, and wherein the irremovable countdown icon cannot be removed from the user interface until after the future event has started;

associating a prerequisite task with the future event, wherein the prerequisite task has been predetermined to be required to be completed by a participant of the future event, wherein the prerequisite task comprises multiple subtasks, wherein a current subtask of the prerequisite task is presented in a current window in a task application user interface;

prioritizing subtasks of the prerequisite task to identify a low priority subtask and a high priority subtask from the prerequisite task, wherein the low priority subtask has been predetermined to be less critical to the future event than the high priority subtask;

associating prioritized subtasks of the prerequisite task with time subunits depicted by the irremovable countdown icon;

retrieving historic data for a particular user, wherein the particular user is the participant of the future event, and wherein the historic data describes how long the particular user has taken to complete each of the multiple subtasks during past projects;

determining, by one or more processors, whether sufficient time for completing all subtasks of the prerequisite tasks exists according to the historic data for the particular user;

in response to determining that sufficient time for completing all subtasks of the prerequisite task does not exist, generating a recommendation to modify the prerequisite task by eliminating the low priority subtask from the prerequisite task;

receiving a signal accepting the recommendation to modify the prerequisite task;

in response to receiving the signal accepting the recommendation to modify the prerequisite task, waiting until the current subtask from the prerequisite task is completed;

in response to determining that the current subtask is complete, automatically replacing, in the task application user interface, the current subtask with a suggested next subtask from the prerequisite task;

in response to determining that the current subtask has been automatically replaced with the suggested next subtask, populating the current window in the task application user interface with a generic solution for the suggested next subtask;

detecting a cursor hovering over the irremovable countdown icon; and in response to detecting the cursor hovering over the irremovable countdown icon, displaying a pop-up window of information describing and related to the future event, wherein the future event is a teleconference meeting, and wherein the information describing the future event comprises a subject of the teleconference meeting, prerequisite tasks that have been predetermined as being required to be complete before the teleconference meeting, and participants scheduled to participate in the teleconference meeting.

2. A computer program product for aiding a user with time management before a future event, the computer program product comprising:
   a non-transitory computer readable storage media;
   first program instructions to receive an event alert, for a future event, at a computer, wherein the computer comprises a display having a user interface;
   second program instructions to display the event alert on the user interface;
   third program instructions to, in response to receiving the event alert, automatically generate and display an irremovable countdown icon on the user interface, wherein the irremovable countdown icon visually represents an amount of time remaining before the future event, and wherein the irremovable countdown icon cannot be removed from the user interface until after the future event has started;
   fourth program instructions to associate a prerequisite task with the future event, wherein the prerequisite task has been predetermined to be required to be completed by a participant of the future event, wherein the prerequisite task comprises multiple subtasks, wherein a current subtask of the prerequisite task is presented in a current window in a task application user interface;
   fifth program instructions to prioritize subtasks of the prerequisite task to identify a low priority subtask and a high priority subtask from the prerequisite task, wherein the low priority subtask has been predetermined to be less critical to the future event than the high priority subtask;
   sixth program instructions to associate prioritized subtasks of the prerequisite task with time subunits depicted by the irremovable countdown icon;
   seventh program instructions to retrieve historic data for a particular user, wherein the particular user is the participant of the future event, and wherein the historic data describes how long the particular user has taken to complete each of the multiple subtasks during past projects;
   eighth program instructions to determine whether sufficient time for completing all subtasks of the prerequisite tasks exists according to the historic data for the particular user;
   ninth program instructions to, in response to determining that sufficient time for completing all subtasks of the prerequisite task does not exist, generate a recommendation to modify the prerequisite task by eliminating the low priority subtask from the prerequisite task;
   tenth program instructions to receive a signal accepting the recommendation to modify the prerequisite task;
   eleventh program instructions to, in response to receiving a signal accepting the recommendation to modify the prerequisite task, wait until the current subtask from the prerequisite task is completed;
   twelfth program instructions to, in response to determining that the current subtask is complete, automatically replace, in the task application user interface, the current subtask with a suggested next subtask from the prerequisite task;
   thirteenth program instructions to, in response to determining that the current subtask has been automatically replaced with the suggested next subtask, populate the current window in the task application user interface with a generic solution for the suggested next subtask;
   fourteenth program instructions to detect a cursor hovering over the irremovable countdown icon; and
   fifteenth program instructions to, in response to detecting the cursor hovering over the irremovable countdown icon, display a pop-up window of information describing and related to the future event, wherein the future event is a teleconference meeting, and wherein the information describing the future event comprises a subject of the teleconference meeting, prerequisite tasks that have been predetermined as being required to be complete before the teleconference meeting, and participants scheduled to participate in the teleconference meeting,
   wherein the first, second, third, fourth, fifth, sixth, seventh, eighth, ninth, tenth, eleventh, twelfth, thirteenth, fourteenth, and fifteenth program instructions are stored on the non-transitory computer readable storage media.

3. The computer program product of claim 2, wherein the event alert comprises an option to permanently remove the event alert from the user interface, and wherein the computer program product further comprises:
   sixteenth program instructions to receive an input to activate the option to permanently remove the event alert from the user interface; and
   seventeenth program instructions to maintain a display of the irremovable countdown icon after receiving the input to activate the option to permanently remove the event alert from the user interface,
   wherein the sixteenth and seventeenth program instructions are stored on the non-transitory computer readable storage media.

4. A system comprising:
   a processor, a computer readable memory, and a computer readable storage media;
   first program instructions to receive an event alert, for a future event, at a computer, wherein the computer comprises a display having a user interface;
   second program instructions to display the event alert on the user interface;
   third program instructions to, in response to receiving the event alert, automatically generate and display an irremovable countdown icon on the user interface, wherein the irremovable countdown icon visually represents an amount of time remaining before the future event, and wherein the irremovable countdown icon cannot be removed from the user interface until after the future event has started;
   fourth program instructions to associate a prerequisite task with the future event, wherein the prerequisite task has been predetermined to be required to be completed by a participant of the future event, wherein the prerequisite task comprises multiple subtasks, wherein a current subtask of the prerequisite task is presented in a current window in a task application user interface;
   fifth program instructions to prioritize subtasks of the prerequisite task to identify a low priority subtask and a high priority subtask from the prerequisite task, wherein the low priority subtask has been predetermined to be less critical to the future event than the high priority subtask;
   sixth program instructions to associate prioritized subtasks of the prerequisite task with time subunits depicted by the irremovable countdown icon;

seventh program instructions to retrieve historic data for a particular user, wherein the particular user is the participant of the future event, and wherein the historic data describes how long the particular user has taken to complete each of the multiple subtasks during past projects;

eighth program instructions to determine whether sufficient time for completing all subtasks of the prerequisite tasks exists according to the historic data for the particular user;

ninth program instructions to, in response to determining that sufficient time for completing all subtasks of the prerequisite task does not exist, generate a recommendation to modify the prerequisite task by eliminating the low priority subtask from the prerequisite task;

tenth program instructions to receive a signal accepting the recommendation to modify the prerequisite task;

eleventh program instructions to, in response to receiving a signal accepting the recommendation to modify the prerequisite task, wait until the current subtask from the prerequisite task is completed;

twelfth program instructions to, in response to determining that the current subtask is complete, automatically replace, in the task application user interface, the current subtask with a suggested next subtask from the prerequisite task;

thirteenth program instructions to, in response to determining that the current subtask has been automatically replaced with the suggested next subtask, populate the current window in the task application user interface with a generic solution for the suggested next subtask;

fourteenth program instructions to detect a cursor hovering over the irremovable countdown icon; and fifteenth program instructions to, in response to detecting the cursor hovering over the irremovable countdown icon, display a pop-up window of information describing and related to the future event, wherein the future event is a teleconference meeting, and wherein the information describing the future event comprises a subject of the teleconference meeting, prerequisite tasks that have been predetermined as being required to be complete before the teleconference meeting, and participants scheduled to participate in the teleconference meeting, wherein the first, second, third, fourth, fifth, sixth, seventh, eighth, ninth, tenth, eleventh, twelfth, thirteenth, fourteenth, and fifteenth program instructions are stored on the computer readable storage media for execution by the processor via the computer readable memory.

5. The system of claim 4, wherein the event alert comprises an option to permanently remove the event alert from the user interface, and wherein the system further comprises:

sixteenth program instructions to receive an input to activate the option to permanently remove the event alert from the user interface; and seventeenth program instructions to maintain a display of the irremovable countdown icon after receiving the input to activate the option to permanently remove the event alert from the user interface, wherein the seventeenth and seventeenth program instructions are stored on the computer readable storage media for execution by the processor via the computer readable memory.

\* \* \* \* \*